April 30, 1968     D. TOGNI     3,381,112
ELECTRIC BOILER FOR CENTRAL HEATING
Filed July 15, 1965
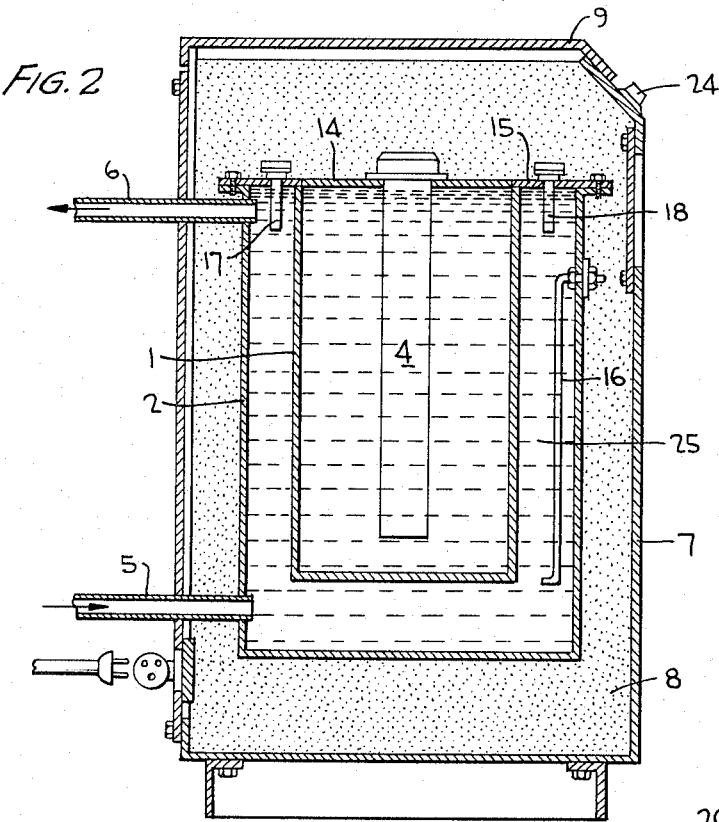
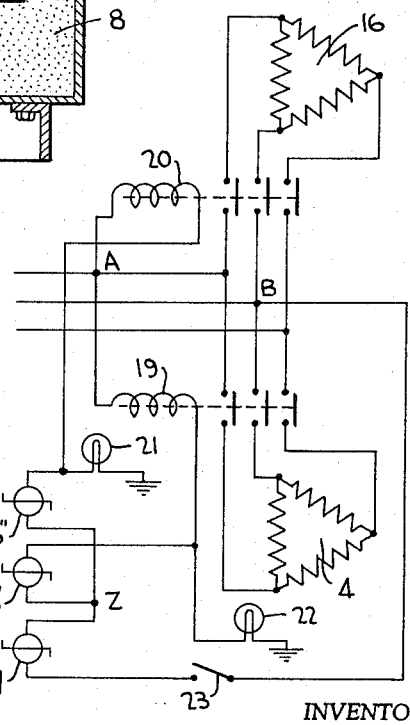
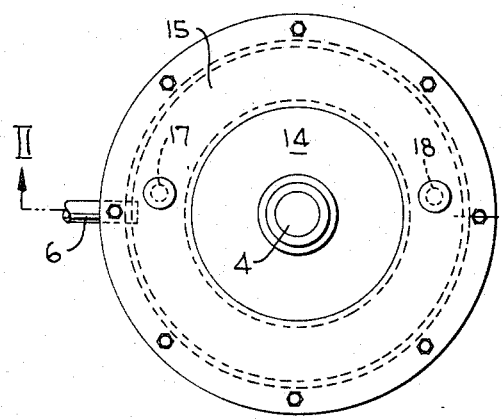
INVENTOR,
DANIEL TOGNI
BY
ATTORNEYS

# United States Patent Office 3,381,112
Patented Apr. 30, 1968

3,381,112
ELECTRIC BOILER FOR CENTRAL HEATING
Daniel Togni, Le Locle, Switzerland, assignor to
Paul Kolb A.G., Bern, Switzerland
Filed July 15, 1965, Ser. No. 472,232
5 Claims. (Cl. 219—326)

ABSTRACT OF THE DISCLOSURE

An electric boiler for central heating comprising a first tank containing water to be heated and a second tank arranged within the first tank which contains a product having a thermal capacity greater than that of water. A first electrical heating element is at least partially submerged in the second tank filled with the product and a second electrical heating element is at least partially submerged in the first tank filled with water. A current supply circuit means is provided for the first and second electrical heating elements. At least one thermostat controlled by the temperature of the water to be heated interrupts the current supply circuit means for the first electrical heating element as soon as the water temperature has reached a certain value below the boiling point of water. Furthermore, a second thermostat controlled by the water temperature interrupts the current supply circuit means for the second electrical heating element as soon as the water temperature has reached a value which is intermediate that at which the aforesaid at least one thermostat operates and the boiling point of water.

The present invention has reference to an improved electric boiler for central heating, and, more specifically, relates to an improvement of the subject matter of Swiss Patent 346,990.

It is a primary object of the present invention to provide an improved electric boiler for central heating which is relatively simple and economical in construction yet highly reliable in operation.

Another considerable object of this invention is the provision of an improved boiler construction for central heating which enables more efficient heating of the boiler water.

Broadly speaking, the present invention is directed to an electric boiler for central heating incorporating a first tank or receptacle for the water to be heated, a second tank or receptacle arranged in the aforesaid first tank, which contains a product of which the thermal capacity is greater than that of water, for instance, the chemical product, "Anlassalz 275." Moreover, an electrical heating member or element is submerged in this second receptacle, and, furthermore, at least one thermostat controlled by the water temperature interrupts the supply current circuit of this heating element as soon as the water temperature reaches a certain value which is below the boiling point.

Characteristic of the inventive heating boiler is that is exhibits a second heating element which is submerged in the receptacle or tank filled with water as well as incorporating a second thermostat controlled by the water temperature and which interrupts the supply current circuit of this second heating element as soon as the temperature of the water reaches a value which is between that at which the first themostat responds and the boiling point of water.

Other features, objects and advantages of the invention will become apparent by reference to the following detailed description and drawing in which:

FIGURE 1 is a top plan view of a preferred embodiment of inventive electric boiler for central heating, particularly vewed from above the cover plate for the inner and outer tanks;

FIGURE 2 is a vertical sectional view of the boiler of FIGURE 1 taken along the lines II—II, and further depicting the housing or casing thereof; and FIGURE 3 is a circuit diagram of the electric current circuit for the electric boiler of FIGURES 1 and 2.

Turning attention now to the exemplary embodiment of inventive electric boiler for central heating depicted in FIGURES 1 and 2, it will be seen that such comprises an inner receptacle or tank 1 filled with a product which has a greater thermal capacity than water, for instance the chemical product which is commercially available on the market under the name "Anlassalz 275." This inner receptacle 1 is submerged in the water to be heated contained in an outer receptacle or tank 2. It will further be seen that an electrical heating element 4 extends from above into the inner tank or receptacle 1. Both receptacles 1 and 2 are closed at the top by a substantially plate-shaped or ring target-shaped cover or closure member 15.

The outer receptacle 2 is provided with an inlet stud or pipe 5 for the cold water to be heated and an outlet stud or pipe 6 for the heated water. Outer receptacle 2 is arranged internally of a casing 7 and thermal insulation 8 provided in such casing 7. Casing 7 is obturated by a cover member 9.

The illustrated electric boiler also possesses a second electrical heating element 16 surrounded by the water contained in the outer receptacle 2. It will further be seen that a simple thermostat 17 and a double-thermostat 18 are secured to the cover member 15, extending into the water-containing compartment 25 formed between the inner receptacle 1 and outer receptacle 2. Both thermostats 17 and 18 can be regulated with respect to the temperature at which they operate by means of regulating or adjusting knobs 24.

By inspecting FIGURE 3 it will become apparent that both heating elements 4 and 16 are connected in parallel to a three-phase current supply network. Their switching-in and switching-out is controlled by two relays 19 and 20 which are likewise connected in parallel to two phases of the network, specifically at the junctions A and B. Both of the temperature feeler or sensing elements 18' and 18" of the double-thermostat 18 are coupled in series with the windings of the relays 19 and 20. The sensing element of the thermostat 17 is connected with the junction B and also with the junctions Z of both branches provided with the elements 18' and 18" respectively. The current circuit is completed by two indicator lamps 21 and 22 and a main or line switch 23 which are arranged adjacent the thermostat regulating knobs at the control panel or switchboard.

The thermostats are regulated such that they open at approximately the following temperatures:

The thermostat 18' at 80° C.
The thermostat 18" at 85° C.
The thermostat 17 at 90° C.

Under these conditions the thermostat 18' primarily determines operation of the boiler by successive switching-in and switching-out of the heating element 4, whereas, on the other hand, the heating element 16 controlled by the thermostat 18" is less out of operation. The thermostat 17 brings about switching-out of the current supply in the event both of the other thermostats have not worked; it thus acts as a watchdog or protective thermostat.

The provision of the second heating element submerged in water has the result that operation of the boiler becomes more flexible and the efficiency is considerably increased. Housing of the thermostats at the body of the boiler renders it possible to provide a better over-all appearance for the entire unit.

While there is shown and described a present preferred embodiment of the invention it is to be distinctly understood that the invention is not limited thereto but may be otherwise variously embodied and practised within the scope of the following claims.

What is claimed is:

1. Electric boiler for central heating comprising a first tank containing water to be heated, a second tank arranged within said first tank containing a product having a thermal capacity greater than that of water, a first electrical heating element at least partially submerged in said second tank filled with said product, a second electrical heating element at least partially submerged in said first tank filled with water, current supply circuit means for said first and second electrical heating elements, at least one thermostat controlled by the temperature of the water to be heated for interrupting said current supply circuit means for said first electrical heating element as soon as the water temperature has reached a certain value below the boiling point of water, and a second thermostat controlled by said water temperature for interrupting the current supply circuit means for said second electrical heating element as soon as the water temperature has reached a value which is intermediate that at which said at least one thermostat operates and the boiling point of water.

2. Electric boiler for central heating as defined in claim 1 wherein said at least one thermostat and said second thermostat are constructed to provide a double-thermostat.

3. Electric boiler for central heating as defined in claim 1 further including a protective thermostat for simultaneously interrupting said current supply circuit means for both said first and second electrical heating elements as soon as the water temperature has reached a value which is intermediate the temperature at which said second thermostat operates and the boiling point of water.

4. Electric boiler for central heating as defined in claim 1 wherein said first and second tanks are combined to provide a boiler unit, said at least one thermostat and said second thermostat being incorporated at said boiler unit.

5. Electric boiler for central heating comprising a first tank containing water to be heated, a second tank arranged within said first tank containing a product having a thermal capacity greater than that of water, a first electrical heating element at least partially submerged in said second tank filled with said product, a second electrical heating element at least partially submerged in said first tank filled with water, current supply circuit means for said first and second electrical heating elements, at least one thermostat extending into said first tank controlled by the temperature of the water to be heated for interrupting said current supply circuit means for said first electrical heating element as soon as the water temperature has reached a certain value below the boiling point of water, and a second thermostat extending into said first tank controlled by said water temperature for interrupting the current supply circuit means for said second electrical heating element as soon as the water temperature has reached a value which is intermediate that at which said at least one thermostat operates and the boiling point of water.

References Cited

UNITED STATES PATENTS 1,779,128  10/1930  Handley _____ 219—326

FOREIGN PATENTS 69,901  8/1915  Switzerland.
341,980  12/1959  Switzerland.
346,990  7/1960  Switzerland.

ANTHONY BARTIS, *Primary Examiner.*